US011498696B2

(12) United States Patent
Assel et al.

(10) Patent No.: US 11,498,696 B2
(45) Date of Patent: Nov. 15, 2022

(54) APPARATUS AND METHOD TO IMPROVE A SITUATIONAL AWARENESS OF A PILOT OR DRIVER

(71) Applicant: HENSOLDT SENSORS GMBH, Taufkirchen (DE)

(72) Inventors: Michael Assel, Kissing (DE); Andrea Thum-Jaeger, Neufahrn (DE)

(73) Assignee: HENSOLDT SENSORS GMBH, Taufkirchen (DE)

( * ) Notice: Subject to any disclaimer, the term of this patent is extended or adjusted under 35 U.S.C. 154(b) by 0 days.

(21) Appl. No.: 17/176,661

(22) Filed: Feb. 16, 2021

(65) Prior Publication Data

US 2021/0253269 A1  Aug. 19, 2021

(30) Foreign Application Priority Data

Feb. 17, 2020 (EP) .................................... 20157634

(51) Int. Cl.
*B64D 45/00* (2006.01)
*B60R 1/00* (2022.01)
*F41H 11/02* (2006.01)
*G06F 3/01* (2006.01)
*G06T 11/00* (2006.01)
*G06V 20/13* (2022.01)

(52) U.S. Cl.
CPC ............. *B64D 45/00* (2013.01); *B60R 1/00* (2013.01); *F41H 11/02* (2013.01); *G06F 3/013* (2013.01); *G06T 11/00* (2013.01); *G06V 20/13* (2022.01); *B60R 2300/205* (2013.01)

(58) Field of Classification Search
None
See application file for complete search history.

(56) References Cited

U.S. PATENT DOCUMENTS

| 2006/0181483 | A1* | 8/2006 | Ari ........................ G02B 15/00 |
| | | | 359/630 |
| 2007/0201015 | A1* | 8/2007 | Gidseg ................ G06V 10/255 |
| | | | 356/29 |
| 2011/0142285 | A1  | 6/2011 | Gidseg et al. |
| 2012/0147133 | A1* | 6/2012 | Hadwiger .......... H04N 5/23238 |
| | | | 348/36 |
| 2014/0251123 | A1  | 9/2014 | Venema |

OTHER PUBLICATIONS

Extended European Search Report dated Jul. 7, 2020 in related/corresponding EP Application No. 20157634.5.

* cited by examiner

*Primary Examiner* — Heather R Jones
(74) *Attorney, Agent, or Firm* — Patent Portfolio Builders PLLC

(57) ABSTRACT

An apparatus to improve a situational awareness of a pilot or driver controlling a vehicle using a control appliance. The control appliance includes a display for depicting surroundings of the vehicle, and the vehicle includes a missile warner and a sensor for fine tracking (FTS) configured to provide high-resolution images for a tracking of an approaching missile detected by the missile warner. The apparatus also includes a control unit, configured to couple a directable line-of-sight of the FTS with the display, and to employ the high-resolution images of the FTS to improve the depiction of the surroundings of the vehicle on the display.

16 Claims, 2 Drawing Sheets

APPARATUS AND METHOD TO IMPROVE A SITUATIONAL AWARENESS OF A PILOT OR DRIVER

CROSS-REFERENCE TO RELATED APPLICATION

This application claims priority under 35 USC § 119 to EP Application 20 157 634.5, filed Feb. 17, 2020, the entire disclosure of which is herein expressly incorporated by reference.

FIELD

Exemplary embodiments of the present invention relate to an apparatus to improve a situational awareness of a pilot or driver controlling a vehicle, and to a method to improve a situational awareness of a pilot or driver controlling a vehicle, and in particular to dual-use Directional Infrared Counter-measures (DIRCM).

BACKGROUND

Defensive Aids Systems of military vehicles generically consist of a missile warner, means for counter-measures, and a display device, along with some controlling apparatus. In the past, aircraft in particular used to employ warners for flying objects based on radar or ultraviolet sensors, and counter-measures included e.g., flares against infrared-guided and chaffs against radar-guided flying objects. Over the past decade, missile warners have increasingly turned towards sensors operating in the infrared part of the spectrum. These infrared sensors are simultaneously employed for panoramic night vision, as the infrared frequencies predominantly used by these sensors also form the wave band of common night vision devices. As it is imperative for a missile warner to cover the complete sphere around the aircraft, night vision in every direction can therefore be provided. The number of sensors on an aircraft is usually limited (typically, missile warners comprise between three and six sensors), and each sensor will therefore need to cover a relatively large solid angle in order to achieve a covering of the full sphere. In consequence, the angular resolution provided by these sensors is low, which in turn limits the detection/recognition and identification ranges of these sensors. Therefore, the panoramic night vision provided by sensors of the missile warner is used in particular for orientation (indicating e.g., the horizon, or large objects like mountains or houses), and provides assistance for take-off and landing, as e.g., in whiteout or brownout situations. However, due to their low resolution, these sensors prove inadequate for reconnaissance purposes. This problem exists in various degrees also on vehicles other than aircraft.

Therefore, there exists a demand for a cost-effective and efficient way to provide better resolution to the image obtained from the missile warner sensors. Further constraints on systems intended to satisfy this demand can e.g., derive from the weight of additional equipment, or from the readiness with which the pilot or driver of the vehicle has access to the data.

SUMMARY OF THE INVENTION

Exemplary embodiments of the present invention relate to an apparatus to improve a situational awareness of a pilot or driver controlling a vehicle by means of a control appliance, the control appliance comprising a display for depicting surroundings of the vehicle, and the vehicle comprising a missile warner and a sensor for fine tracking (FTS). The FTS is configured to provide high-resolution images for a tracking of approaching missiles detected by the missile warner. The apparatus comprises a control unit configured to couple a directable line-of-sight of the FTS with the display, and to employ the high-resolution images of the FTS to improve the depiction of the surroundings of the vehicle on the display.

Here, the term vehicle is understood to be broadly defined, and may stand for any land-based, airborne, sea-based or amphibious manned or unmanned locomotive machine. The control appliance can be for a pilot or driver who is on board of the vehicle, or remote from the vehicle as e.g., in a case where the vehicle is a drone. Embodiments provide an FTS focused on an angle of ten degrees or less, or e.g., of two or five degrees, around a central line-of-sight, with resolutions at least 5 times, but often 10 to 15 or more times higher than the resolution achieved by means of sensors of the missile warner. The line-of-sight can be pointed in any direction; it is understood that the possible directions of the line-of-sight of the FTS should merely encompass at least a part of the directions to the depicted surroundings. Furthermore, it is not required that the surroundings depicted on the display are derived from sensors of the missile warner; data from other sensors or cameras, both on board or remote from the vehicle, and operating both in the infrared or in other wave bands (such as e.g., in the visible domain), as well as maps or mere geographical data may equally be employed to depict the surroundings on the display.

Optionally, the control unit is configured to direct the line-of-sight of the FTS.

It is understood that the control unit is not necessarily the only device adapted to point the FTS.

Optionally, the control unit is furthermore configured to couple to the control appliance such that the driver or pilot can indicate a desired line-of-sight of the FTS.

This can be achieved e.g., by means of a pointing device, like a control column or a joystick, or by a computer mouse.

Optionally, the control unit is configured to track a line-of-sight of the driver or pilot, and to align the line-of-sight of the FTS with the line-of-sight of the driver or pilot.

Such eye trackers are common appliances in controlling equipment of military vehicles, in particular of manned aircraft.

Exemplary embodiments of the present invention also relate to a system for imaging surroundings of a vehicle, comprising a missile warner and a FTS configured to provide high-resolution images for a tracking of approaching missiles detected by the missile warner, a control appliance comprising a display for depicting surroundings of the vehicle, and an apparatus as described above.

Optionally the missile warner comprises one or more infrared sensors, configured to produce sensor data for depicting a surround (panoramic, or full-sphere) view from the vehicle, and the system comprises a Directional Infrared Counter-measures (DIRCM) appliance which includes the FTS as one of its parts, wherein the line-of-sight of the FTS is directable and the FTS is a further infrared sensor, and wherein the DIRCM appliance is configured to initiate, using the high-resolution images of the FTS, counter-measures to protect the vehicle against threatening flying objects.

Besides missile warners operating in the infrared, recent years have seen an increased use of DIRCM as replacements or as supplements of counter-measures such as e.g., flares against infrared-directed flying objects. Typically, DIRCM appliances direct a laser beam at the homing head of the approaching flying object, which is then confused by using a suitable modulation of the beam, to the effect that seeking out the aircraft is rendered impossible for the homing head, and that the flying object loses its orientation. Maximizing the energy density of the laser beam at the homing head requires a small divergence of the laser beam. The beam must therefore be pointed very precisely, which in consequence requires a very precise sighting. The angular resolution of the missile warner sensors is usually insufficient for this task, such that the DIRCM appliance typically relies on its own FTS, which is highly focused but provides a high angular resolution. Present realizations of DIRCM comprise an FTS operating in the same infrared wave band as the sensors of the missile warner, as the goal of detection and tracking of an approaching flying object is the same for both missile warner and DIRCM sensors. The FTS can be coupled to the DIRCM laser beam, and can be pointed in any direction by means of an alignment facility involving e.g., a gimbal system and contained in every DIRCM appliance.

Optionally, the DIRCM appliance is configured to perform a precise classification of the flying object based on the high-resolution images provided by the FTS.

Classification of flying objects in the infrared is based on the data of the sensors which detected the flying object, i.e., by data of the missile warner sensor or sensors. Once the FTS has been directed at the flying object, its data can be used for a more precise classification.

Optionally, the missile warner comprises one or more infrared sensors configured to produce sensor data for depicting a surround view of the vehicle, and the system further comprises a directional visible counter-measures appliance, which includes the FTS as a part, and wherein the line-of-sight of the FTS is directable and the FTS includes a further sensor operating in the visible part of the electromagnetic spectrum. Similarly to the DIRCM appliance before, the directional visible counter-measures appliance is configured to initiate, using the high-resolution images of the FTS, counter-measures to protect the vehicle against flying objects.

Optionally, the directional visible counter-measures appliance is configured to perform a more precise classification of the flying object based on the high-resolution images provided by the FTS.

Optionally, the control unit is configured to direct the line-of-sight of the FTS between times where the FTS is employed in the counter-measure against an approaching missile or times where the DIRCM appliance operates the FTS.

The control unit should only operate the FTS at times when the DIRCM system does not direct the line-of-sight of the FTS. This can be achieved e.g., by subordinating requests to direct the FTS from the control unit to requests from the DIRCM.

Optionally, the display can be a helmet-mounted display, a multi-function display, or a head-up display or any other display providing the image to the pilot.

These types of displays are common in controlling equipment of military vehicles.

Optionally, the DIRCM appliance and/or the directed visible counter-measures appliance is/are configured, during a counter-measure against a flying object, to identify launch coordinates where the flying object was launched, and wherein the FTS, after being employed for the counter-measure operation by the DIRCM appliance and/or by the directed visible counter-measures appliance, is configured to automatically direct its line-of-sight at the identified launch coordinates. This provides the advantage that the pilot or driver can immediately examine the launch site.

Exemplary embodiments of the invention also relate to a method for improving a situational awareness of a pilot or driver of a vehicle, the vehicle comprising a display for depicting surroundings of the vehicle, a missile warner, and a sensor for fine tracking (FTS), wherein the FTS is configured to provide high-resolution images for a tracking of approaching missiles detected by the missile warner, with the method comprising the steps coupling a directable line-of-sight of the FTS with the display, employing the high-resolution images of the FTS to improve the depiction of surroundings of the vehicle on the display.

Exemplary embodiments of the invention furthermore relate to a computer program product comprising stored software code adapted to perform the steps of this method when executed on a data processing system.

Embodiments provide, in particular, the advantage that a DIRCM, which hitherto is only active for a brief time during a counter-measure action, can be employed for different tasks in other times. In particular, the high-resolution image of the DIRCM appliance, or the FTS respectively, is made available to external systems for further operations. These comprise, in particular, the following:

In combination with a pointing device, such as, for example, a joystick or an eye tracker of the pilot or driver, the line-of-sight of the FTS can be coupled to that device, such that an observer will always get a high-resolution image from the selected direction or the pilot or driver's line-of-sight embedded into and/or superimposed onto e.g. a multi-function display, or a helmet-mounted display. In this way, depending on the wave band the camera is operating in, a video in the visible domain (400 nm-700 nm), in the near infrared (700 nm-1.4 µm), short-wave infrared (1.4 µm-2.5 µm), mid-wave infrared (3 µm-5 µm) or far infrared (8 µm-12 µm) can be displayed.

For an FTS operating in the mid-wave or far infrared, the line-of-sight of the FTS can be coupled to a pointing device, such that pilot or driver always obtains a night-vision capable infrared image from his or her line-of-sight embedded into or superimposed onto a multi-function display or a helmet-mounted display.

In addition, the high-resolution image can be embedded into the panoramic view obtained from the missile warner sensors. In this way, a low-resolution panoramic view, suited e.g., for mere orientation, is combined with a highly resolved image, which provides a much more detailed view over longer distances in a limited area which, for example, can be used for a digital zoom. This embodiment provides an extension of the range of detection, recognition and identification as determined according to STANAG 4347 by a factor of up to 20.

Furthermore, the high-resolution sensor can be employed as a sensor for verification. This means that the (pre-)alarm generated by the missile warning system is investigated further by means of the high-resolution sensor, and therefore can be confirmed as an alarm or dismissed as a false alarm with greater precision due to the higher resolution. In order to achieve this goal, a classifier (distinguishing a threatening from a non-threatening flying object or other light sources) must be integrated in the image processing of the FTS into the DIRCM.

BRIEF DESCRIPTION OF DRAWINGS

Various embodiments of the present invention will be described in the following by way of examples only, and with respect to the accompanying drawings, in which.

DETAILED DESCRIPTION

Various examples will now be described more fully with reference to the accompanying drawings in which some examples are illustrated.

Accordingly, while examples are capable of various modifications and alternative forms, the illustrative examples in the figures will herein be described in detail. It should be understood, however, that there is no intent to limit examples to the particular forms disclosed, but on the contrary, examples are to cover all modifications, equivalents, and alternatives falling within the scope of the disclosure. Like reference numbers refer to like or similar elements throughout the description of the figures.

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
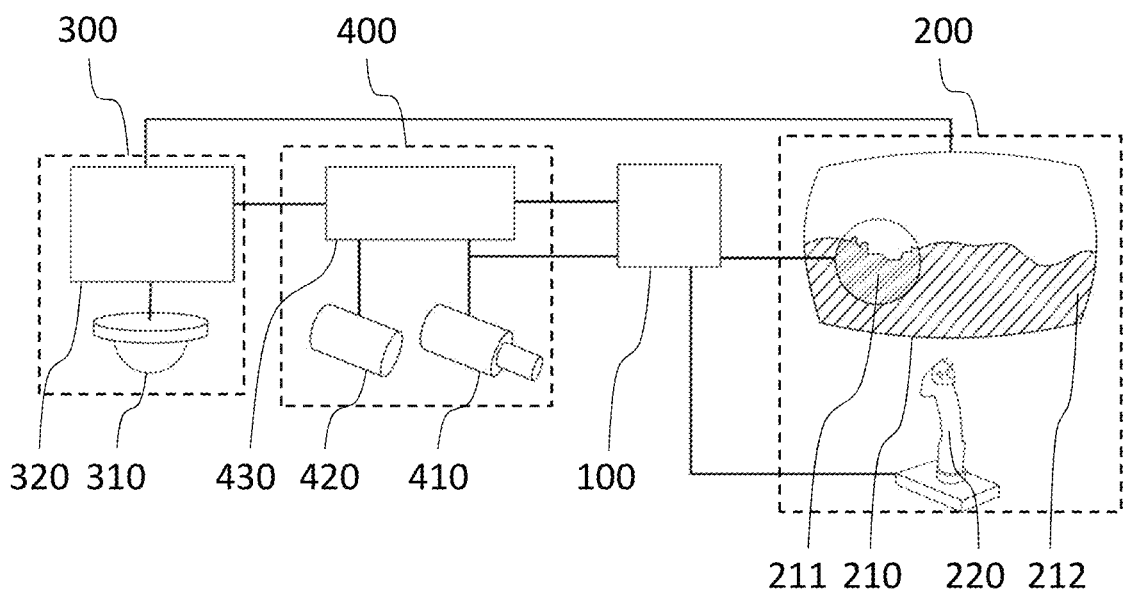
FIG. 1 shows a system comprising a missile warner, DIRCM with FTS, control appliance, and an apparatus for employing the FTS data in the control appliance.

FIG. 1 shows an apparatus to improve a situational awareness of a pilot or driver controlling a vehicle by means of a control appliance 200, the control appliance 200 comprising a display 210 for depicting surroundings of the vehicle, and the vehicle comprising a missile warner 300 and a sensor for fine tracking (FTS) 410. The FTS 410 is configured to provide high-resolution images 211 for a tracking of approaching missiles detected by the missile warner 300. The apparatus comprises a control unit 100 configured to couple a directable line-of-sight of the FTS 410 with the display 210, and to employ the high-resolution images of the FTS 410 to improve the depiction of the surroundings of the vehicle on the display 210.

In this embodiment, the missile warner 300 exemplarily comprises a wide-angle sensor 310, which operates in the infrared range and whose field of view is understood to cover a large solid angle of the sphere surrounding the vehicle, at a correspondingly low angular resolution. A typical missile warner 310 requires four to six such wide-angle sensors 310 in order to cover the full sphere around the vehicle. The missile warner 300 is furthermore depicted with a classifier 320, which holds the control devices configured to detect, locate and identify flying objects in the data collected by the wide-angle sensor 310, to a precision constrained by the low angular resolution of the wide-angle sensor 310. The classifier 320 is adapted to detect a flying object and to issue an alarm signal, upon which counter-measures are initiated, which may be performed automatically or under a control of the pilot or driver. The classifier 320 is furthermore configured to transmit data collected about the flying object to other systems, as e.g., to counter-measure devices, or to the driver or pilot.

The data of the wide-angle sensor 310 is furthermore transmitted to a display 210 in the control appliance 200 of the vehicle, where it is processed and used as a source for panoramic night vision 212. Due to the low resolution of the wide-angle sensors, this image is not sufficient for reconnaissance purposes. Larger objects—e.g., landmarks like mountains, or structures like buildings—are distinguishable, and the low-resolution image 212 of the surroundings can be beneficial for an orientation of the pilot or driver regarding the position of the vehicle in the landscape, or for cases of heavy weather or environmental conditions like e.g., whiteouts or brownouts.

One of the counter-measures coupled to the missile warner consists of a Directional Infrared Counter Measure (DIRCM) appliance 400, which comprises the FTS 410 together with an exemplary infrared laser device 420. Alternatively, or in addition to the DIRCM appliance 400, the counter-measures, and in particular the FTS 410, could also operate in the visible range of the electromagnetic spectrum. The following description will focus on infrared counter-measures, but this should not be construed to limit the counter-measures to infrared wavelengths.

The DIRCM appliance 400 reacts to an alert of the missile warner 300, and directs an infrared laser beam e.g., at a homing head of a heat-seeking missile, with the aim of confusing the orientation of the missile such that it misses its target. To this effect, the laser beam is itself highly collimated—e.g., to less than a degree in angular divergence—and therefore needs to be directed at the flying object in a very precise way. In order to achieve this precise alignment, the DIRCM appliance 400 operates the FTS 410 as one of its parts. The FTS 410—which in this embodiment may e.g., collect data in the infrared part of the spectrum, as does the wide-angle sensor 310—covers only a very small solid angle, but achieves a high-resolution, and can therefore also distinguish objects more precisely and/or at a greater distance than the wide-angle sensor 310 of the missile warner 300. A DIRCM control unit 430 is depicted which couples the FTS 410 and the laser 420, and directs both of them at the flying object for example by using a gimbaled system.

Conventionally, the FTS 410 is not employed by systems other than the DIRCM appliance. The DIRCM appliance 400 operates the laser 420 and the FTS 410 only in reaction to a prior warning signal of the missile warner 300. The FTS 410, however, is typically configured to constantly collect data. The apparatus, comprising the control unit 100 and connections to other components of the vehicle, is configured to exploit this data in order to improve the low-resolution image 212 which is provided, in this embodiment, by the wide-angle sensors 310 of the missile warner 300. In the present embodiment, this improvement consists of a high-resolution image 211 in a small area of the display corresponding to the direction of the FTS 410. A pointing device—as here e.g., a joystick 220—is part of the control appliance 200, and adapted to direct the FTS 410 as desired by the pilot or driver. As counter-measures (e.g., in the case of missiles) are highly time-sensitive operations, which can surpass the reaction capacity of the driver or pilot, the operation of the DIRCM appliance 400 triggered by the alarm of the missile warner 300 should have priority over the input of the driver on the direction of the FTS 410. For this reason, the control unit 100 and/or the DIRCM appliance 400 can be configured to prioritize DIRCM commands to the FTS 410 if the DIRCM is operational.

Figure 2:
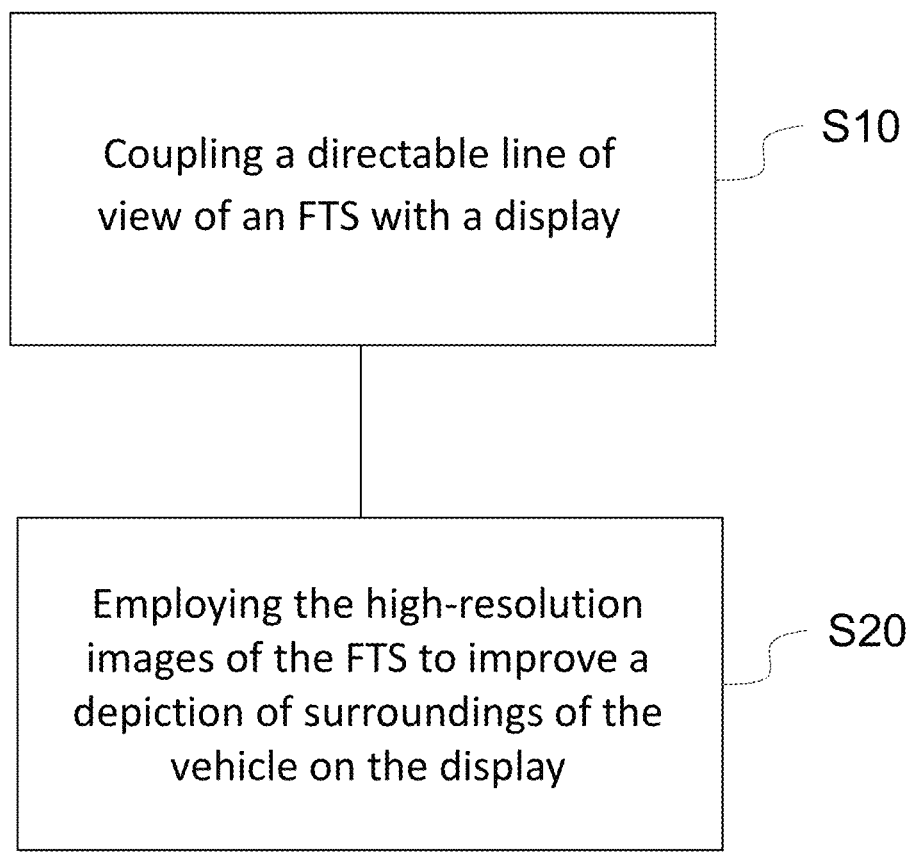
FIG. 2 shows a method for improving a situational awareness of a driver or pilot.

FIG. 2 shows the steps of a method for improving a situational awareness of a pilot or driver of a vehicle according to the present invention. The vehicle comprises a display 210 for depicting a surround of the vehicle, a missile warner 300, and an FTS 410. The FTS 410 is configured to provide high-resolution images for tracking of missiles detected by the missile warner 300. The method comprises a step S10 of coupling a directable line-of-sight of the FTS 410 with the display 210, followed by a step S20 of employing the high-resolution images of the FTS 410 in order to improve the depiction of surroundings of the vehicle on the display 210.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the wavelength ranges of the sensors, functioning or arrangement of individual elements stated in an exemplary embodiment without leaving the scope of the invention, which is defined by the claims and their legal equivalents, such as further explanations in the description.

LIST OF REFERENCE SIGNS 100 control unit
200 control appliance
210 display
211 high-resolution surroundings
212 low-resolution surroundings
220 control column
300 missile warner
310 wide-angle sensor
320 classifier
400 Directional Infrared or Visible Counter Measures appliance
410 Fine Tracking Sensor
420 Laser
430 DIRCM control

The invention claimed is:

1. An apparatus to improve a situational awareness of a pilot or driver controlling a vehicle using a control appliance comprising a display for depicting surroundings of the vehicle, wherein the vehicle comprises a missile warner and a sensor for fine tracking (FTS), wherein the FTS is configured to provide high-resolution images for a tracking of an approaching missile detected by the missile warner,
the apparatus comprising:
a control unit configured to couple a directable line-of-sight of the FTS with the display, and to employ the high-resolution images of the FTS to improve the depiction of the surroundings of the vehicle on the display and to direct the line-of-sight of the FTS between times when the FTS is employed in a counter-measure against an approaching missile.

2. The apparatus of claim 1, wherein the control unit is coupled to the control appliance such that the driver or pilot can indicate a desired line-of-sight of the FTS.

3. The apparatus of claim 1, wherein the control unit is configured to track a line-of-sight of the driver or pilot, and to align the line-of-sight of the FTS with the line-of-sight of the driver or pilot.

4. A system for imaging surroundings of a vehicle, comprising:
a missile warner;
a sensor for fine tracking (FTS) associated with the missile warner and configured to provide high-resolution images for tracking of approaching missiles detected by the missile warner;
a control appliance comprising a display for depicting surroundings of the vehicle; and
a control unit configured to couple a directable line-of-sight of the FTS with the display, and to employ the high-resolution images of the FTS to improve the depiction of the surroundings of the vehicle on the display and to direct the line-of-sight of the FTS between times when the FTS is employed in a counter-measure against an approaching missile.

5. The system of claim 4, wherein the missile warner comprises one or more infrared sensors configured to produce sensor data for depicting a surround view of the vehicle, and the system further comprising:
a Directional Infrared Counter Measure (DIRCM) appliance, which includes the FTS, wherein the line-of-sight of the FTS is directable and the FTS includes a further infrared sensor,
wherein the DIRCM appliance is configured to initiate, using the high-resolution images of the FTS, countermeasures to protect the vehicle against flying objects.

6. The system of claim 5, wherein the DIRCM appliance is configured to perform a more precise classification of the flying objects based on the high-resolution images provided by the FTS.

7. The system of claim 5, wherein the DIRCM appliance is configured, during a counter-measure against a flying object, to identify launch coordinates where the flying object was launched, and wherein the FTS, after being employed for the counter-measure operation by the DIRCM appliance, is configured to automatically direct its line-of-sight at the identified launch coordinates.

8. The system of claim 4, wherein the missile warner comprises one or more sensors operating in the infrared or visible spectrum, wherein the sensors are configured to produce sensor data for depicting a surround view of the vehicle, and the system further comprising:
- a directional visible counter-measures appliance, which includes the FTS, wherein the line-of-sight of the FTS is directable and the FTS includes a further sensor operating in the visible part of the spectrum,
- wherein the directional visible counter-measures appliance is configured to initiate, using the high-resolution images of the FTS, counter-measures to protect the vehicle against flying objects.

9. The system of claim 8, wherein the directional visible counter-measures appliance is configured to perform a more precise classification of the flying objects based on the high-resolution images provided by the FTS.

10. The system of claim 8, wherein the directed visible counter-measures appliance is configured, during a counter-measure against a flying object, to identify launch coordinates where the flying object was launched, and wherein the FTS, after being employed for the counter-measure operation by the directed visible counter-measures appliance, is configured to automatically direct its line-of-sight at the identified launch coordinates.

11. The system of claim 4, wherein the control unit is configured to direct the line-of-sight of the FTS between when a Directional Infrared Counter Measure (DIRCM) appliance operates the FTS or times when a directional visible counter-measure appliance operates the FTS.

12. The system of claim 4, wherein the display is:
a helmet-mounted display,
a multi-function display, or
a head-up display.

13. A method for improving a situational awareness of a pilot or driver of a vehicle, the vehicle comprising a display for depicting surroundings of the vehicle, a missile warner, and a sensor for fine tracking (FTS), wherein the FTS is configured to provide high-resolution images for a tracking of approaching missiles detected by the missile warner, the method comprising:
- coupling a directable line-of-sight of the FTS with the display; and
- employing the high-resolution images of the FTS to improve the depiction of surroundings of the vehicle on the display by directing the line-of-sight of the FTS between times when the FTS is employed in a counter-measure against an approaching missile.

14. The method of claim 13, further comprising:
- identifying, during a counter-measure against a flying object, launch coordinates where the flying object was launched; and
- automatically directing the line-of-sight of the FTS, after being employed for the counter-measure, at the identified launch coordinates.

15. A non-transitory computer program product comprising software code for improving a situational awareness of a pilot or driver of a vehicle, the vehicle comprising a display for depicting surroundings of the vehicle, a missile warner, and a sensor for fine tracking (FTS), wherein the FTS is configured to provide high-resolution images for a tracking of approaching missiles detected by the missile warner, wherein execution of the software code by a data processing system, causes the data processing system to:
- couple a directable line-of-sight of the FTS with the display; and
- employ the high-resolution images of the FTS to improve the depiction of surroundings of the vehicle on the display by directing the line-of-sight of the FTS between times when the FTS is employed in a counter-measure against an approaching missile.

16. The non-transitory computer program product of claim 15, wherein execution of the software code by a data processing system, causes the data processing system to:
- identify, during a counter-measure against a flying object, launch coordinates where the flying object was launched; and
- automatically direct the line-of-sight of the FTS, after being employed for the counter-measure, at the identified launch coordinates.

* * * * *